US005413138A

United States Patent [19]

Aström

[11] Patent Number: 5,413,138

[45] Date of Patent: May 9, 1995

[54] DEVICE FOR TAPPING OFF OR FILLING FLUID INTO A CONTAINER

[76] Inventor: Halvard Aström, Kärrvägen 26, S-135 55 Tyresö, Sweden

[21] Appl. No.: 119,112

[22] PCT Filed: Mar. 18, 1992

[86] PCT No.: PCT/SE92/00168

§ 371 Date: Sep. 17, 1993

§ 102(e) Date: Sep. 17, 1993

[87] PCT Pub. No.: WO92/16449

PCT Pub. Date: Oct. 1, 1992

[30] Foreign Application Priority Data

Mar. 18, 1991 [SE] Sweden ............ 9100810
Dec. 20, 1991 [SE] Sweden ............ 9103802

[51] Int. Cl.$^6$ ............ F16L 55/10

[52] U.S. Cl. ............ 137/320; 137/321; 251/144

[58] Field of Search ............ 137/319, 320, 321, 15; 251/144

[56] References Cited

U.S. PATENT DOCUMENTS 4,214,599 7/1980 Astrom ............ 137/319
4,420,012 12/1983 Astrom ............ 137/319
4,899,780 2/1990 Astrom ............ 137/319

FOREIGN PATENT DOCUMENTS 3412455 10/1985 Germany .
748726 5/1956 United Kingdom .

*Primary Examiner*—A. Michael Chambers
*Attorney, Agent, or Firm*—Ostrolenk, Faber, Gerb & Soffen

[57] ABSTRACT

An emptying and filling device for a fluid in a container, including an emptying or filling hole closable by a bung. The bung has an outwardly open substantially cylindrical cavity and two mutually spaced projections. The device includes a generally cylindrical housing which is releasably mountable at its open end over the hole. After fastening the housing sealingly against a flange at the hole, a movably arranged bung holder provided with grippers is adapted peripherally to engage and retain the bung by releasable engagement with both projections of the bung, thus enabling, apart from screwing in and out the bung in the hole, a regulatable emptying or filling of the contents of the container without the container needing to be raised into a vertical position before assuming its horizontal emptying and/or filling position.

20 Claims, 6 Drawing Sheets

Fig. 5A
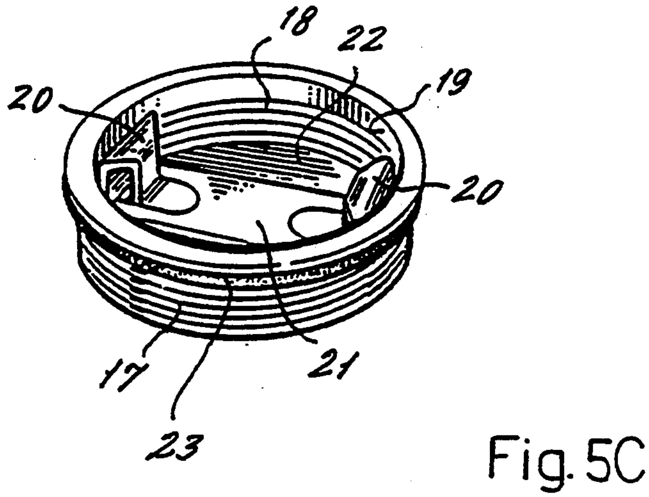
Fig. 5B
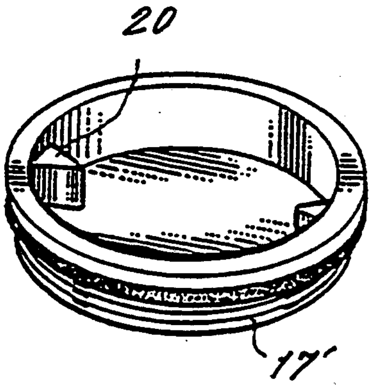
Fig. 5C
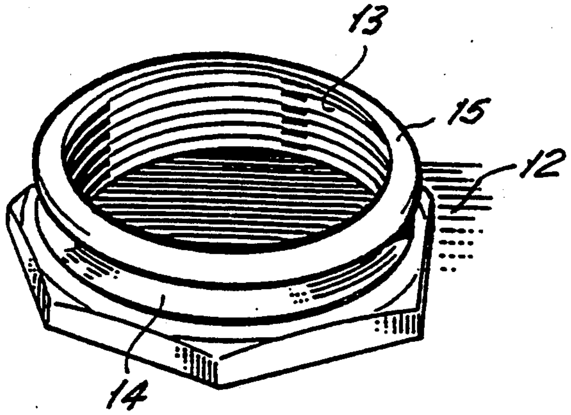
Fig. 4
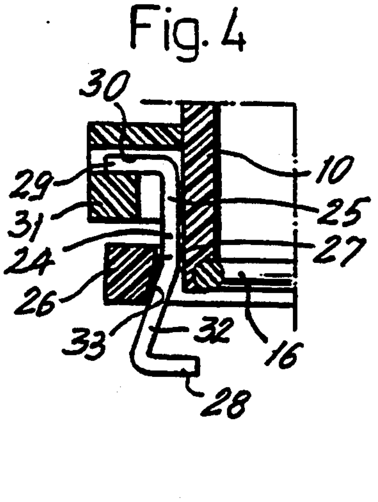
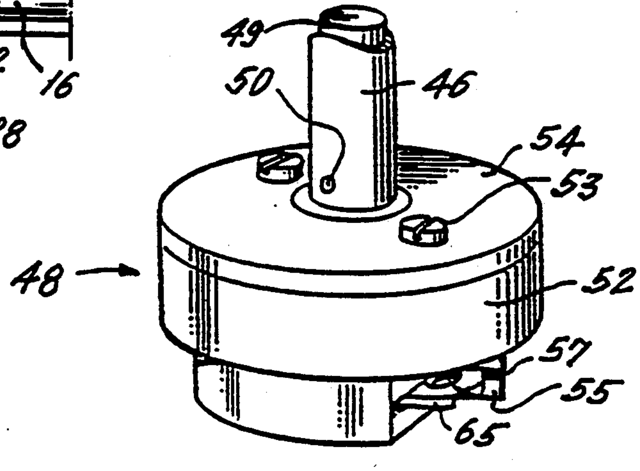
Fig. 6

Fig.13
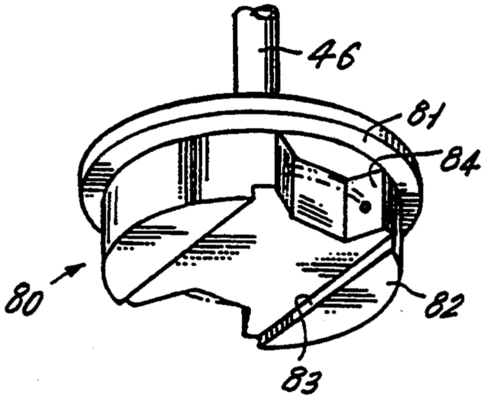
Fig.16
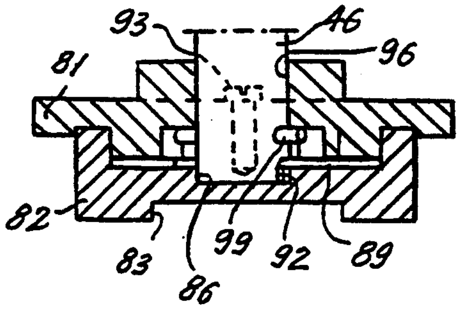
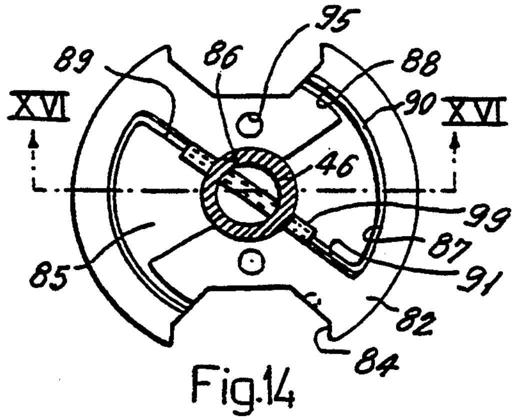
Fig.14
Fig.17
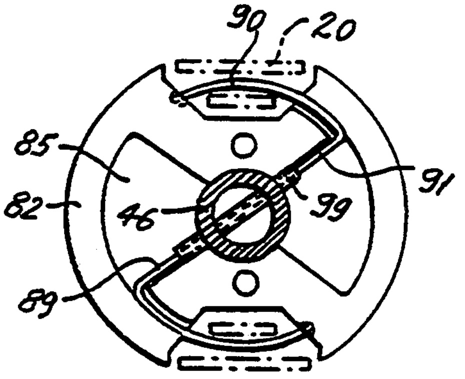
Fig.15
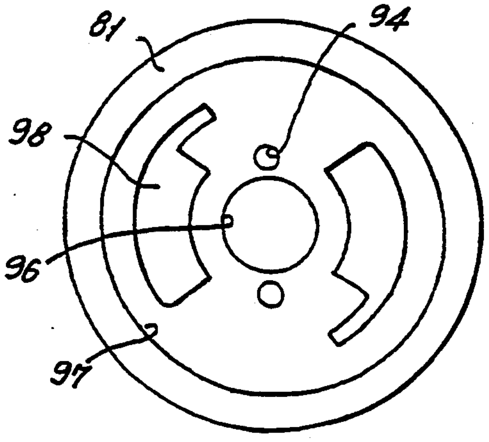

DEVICE FOR TAPPING OFF OR FILLING FLUID INTO A CONTAINER

BACKGROUND OF THE INVENTION

1. Field of the Invention

The present invention relates to a device for use in connection with emptying fluids from or filling fluids into a container via a hole in a wall thereof, the hole being internally threaded and closable with the aid of an externally threaded, generally cylindrical bung, which has an upwardly open generally cylindrical cavity and two projections mutually diametrically opposing and spaced, which project into the cavity.

More specifically, the invention relates to a device of the type including a cylindrical housing having an open end which is intended to be removably mounted over the hole in the container. The housing is provided with an opening in its cylindrical wall for supplying or removing fluid, and includes a tool for manual maneuvering of the bung from a position outside the housing. The tool is provided with a spindle extending displaceably and rotatably through the end wall of the housing opposite its open end. Outside the housing, the spindle is provided with a handle, while at its other end, it is provided with a bung holder which is provided with grippers insertable into the bung cavity for the releasable retention of the bung by the bung holder. The grippers are adapted such as to retain the bung with the bung holder by the action of releasable engagement with both projections on the bung.

2. Description of the Related Art

Devices as described above are primarily utilized in connection with tapping off fluid from, or filling fluid into, containers formed as barrels, via a bung hole closable by a bung in the container. Such devices make it possible to eliminate the risk of the person carrying out the filling or emptying from coming into direct contact with the fluid in question.

In previously known devices of the kind mentioned above, the grippers are formed by two diametrically opposed gripping jaws in the bung holder body having gripping portions facing away from each other by which the gripping jaws can be brought into engagement under pressure against two mutually opposed portions of the circumferential side wall of the bung defining the cavity. The gripping portions of the gripping jaws have always been formed as comparatively sharp edges. Although this may appear advantageous per se, it has been found in practice to have several drawbacks. Namely, gripping portions made in this way cause an appreciable risk of troublesome damage to the side wall if the sharp edged portion come into substantial butting engagement with the side wall. On the other hand, if the gripping portions are designed to be brought into resilient engagement against the wall, the griping portions may allow the bung, when it is screwed out of its hole in the container, to be subjected to fluid flowing through the device, producing an oblique attitude on the bund, so that rescrewing into the hole is made considerably more difficult, and in the worst case quite impossible. The risk of such an oblique attitude of the bung is particularly great with bungs which are made from pressed sheet metal, where the outside thread on the bung is impressed to give a wavy surface on the inside of the circumferential side wall of the cavity of the bung.

SUMMARY OF THE INVENTION

The object of the present invention is to provide a device of the kind mentioned in the introduction, which overcomes the above-mentioned disadvantages of the previously known devices.

As a result of the present invention, there is now provided a tapping device of the kind mentioned in the introduction, which fulfills it objectives in an excellent way, while at the same time can be manufactured at a relatively low price. The device can be mounted in, for example, an oil barrel without leakage occurring, even if the barrel is horizontal and its contents exert a constant pressure on the inside of the bung. In addition, the device can be rapidly and easily fitted and removed from the tapped opening, due to the configuration of its fastening means. When a container is being emptied, the bung is retained by gripping elements, which ensure that the bung does not become loose or cannot be given an oblique attitude by the action of flowing liquid.

The invention will now be described in more detail with reference to the accompanying drawings.

BRIEF DESCRIPTION OF THE DRAWINGS

FIG. 4 is a partial cross-sectional view illustrating the means for releasably fastening the device to the flange.

FIG. 5 is a perspective exploded view of the flange and two alternative types of bung for fitting into the bung hole.

FIG. 6 is a perspective view of the bung holder means associated with the tool of the device.

FIG. 13 is a bottom perspective view of a modified bung holder body for a tool associated with a device in accordance with the present invention.

FIG. 14 is a plan view, seen from above, of the lower part of the bung holder body illustrated in FIG. 3, illustrating two grippers movably mounted therein and in an inactive position.

FIG. 15 is a plan view corresponding to FIG. 14, showing the grippers in an active position.

FIG. 16 is an axial cross-section through the bung holder taken along the line XVI—XVI of FIG. 14.

FIG. 17 is a bottom view plan of an upper part of the bung holder body illustrated in FIG. 13.

DETAILED DESCRIPTION OF THE PREFERRED EMBODIMENTS

Figure 1:
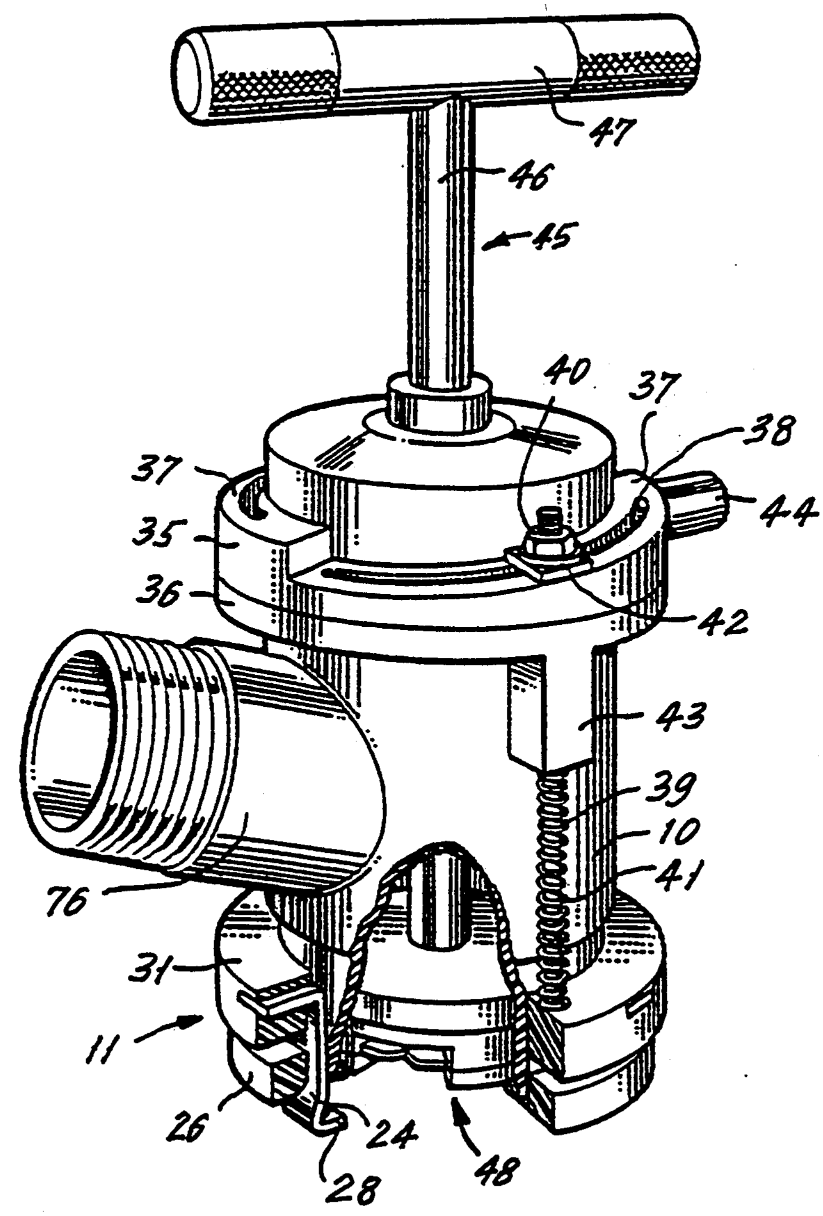
FIG. 1 is a perspective view of an embodiment of the present invention.
Figure 3:
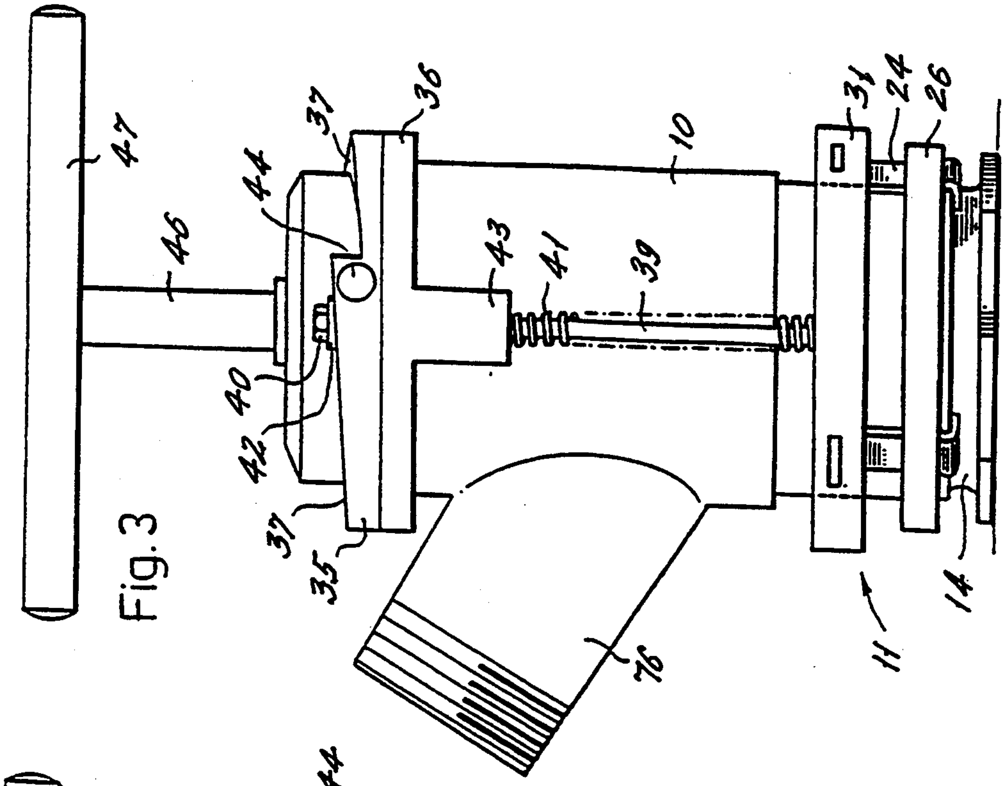
FIG. 3 is a corresponding side view of the device of FIG. 2 fitted to the flange.
Figure 2:
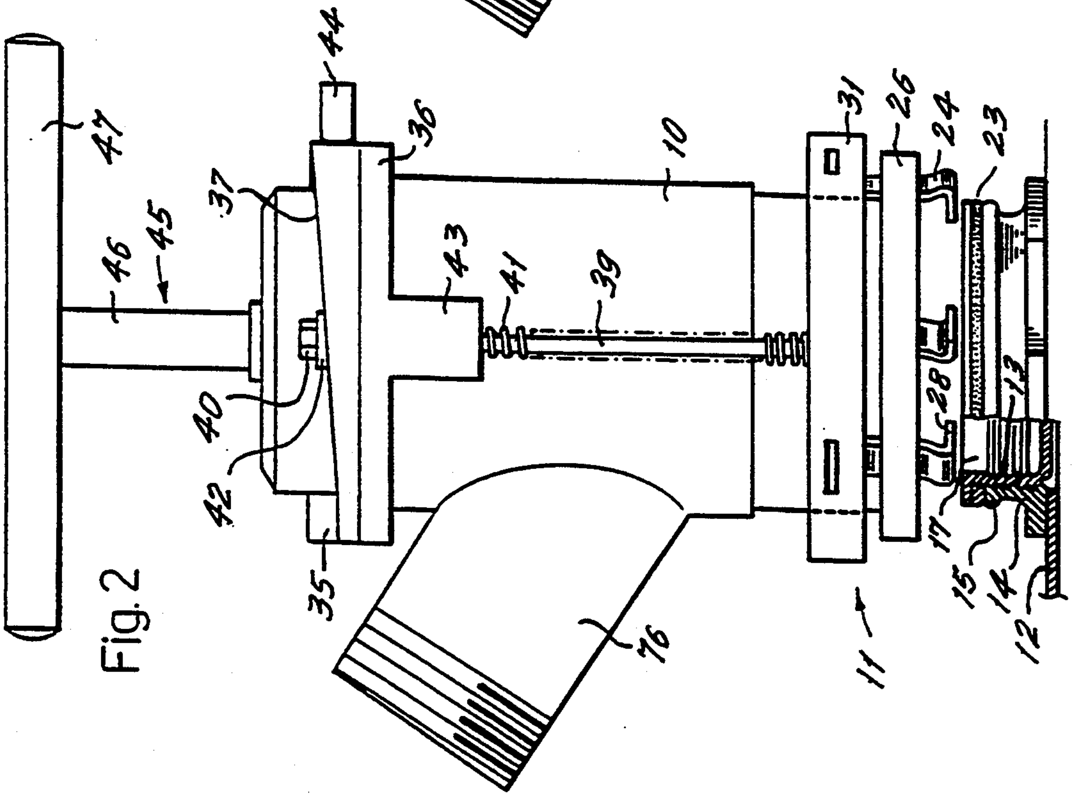
FIG. 2 is a side view of the device of FIG. 1 in a position for mounting it on an annular flange projecting from a container.

Referring to FIGS. 1-3, the device of the present invention includes a generally cylindrical housing 10 having an open and a closed end fastening means generally denoted by the numeral 11, provided on the open end, which enables the housing 10 to be fastened over a bung hole 13 (FIGS. 2 and 5) arranged in a container 12, for filling into and discharging fluid from the container. The hole 13 is formed by an internally threaded pipe stub 14 (FIGS. 2, 3, 5) projecting from the container 12, and at its outer end is provided with an external circumferential edge flange 15, to which the housing 10 can be sealingly fastened using the intermediary of a sealing ring 16 (FIG. 4).

FIG. 5A shows an exteriorly threaded, generally cylindrical bung 17 which is provided with a generally cylindrical outwardly open cavity 19, defined by circumferential side wall 18. Projecting into the cavity 19 are two mutually opposing spaced projections 20 formed by folded end portions of a metal strip 21 welded to the bottom 22 of the bung 17, which is made from pressed sheet metal.

FIG. 5B shows a bung 17' of a somewhat modified embodiment, produced by a casting a suitable metallic material. In this embodiment, the bund 17' is provided with two mutually opposing and spaced projections 20'. In this bung, however, projections 20' are wedged-shaped and produced integral with the bung 17'.

Referring to FIG. 2, the bung 17 is shown screwed into the pipe stub 14, thus closing the hole 13 tight with the intermediary of a sealing ring 23.

The fastening means 11 includes three jaws 24 disposed at uniform pitch around the periphery of the housing 10 at its open end. Jaws 24 have leg portions 25 (FIG. 4), which extend into the housing 10. At their outward bottom ends, the jaws 24 are provided with inwardly folded gripping portions 28, which can be urged against rearward portions of the flange 15 of the pipe stub 14 for bringing the housing 10 into sealing engagement against the flange via the sealing ring 16. At their upper ends, the jaws 24 are provided with outwardly folded end portions (FIG. 4), which are each anchored in a radial through opening 30 in a ring 31 serving as an actuating member for the jaws. The ends 29 are arranged axially displaceable in a region of the housing 10 behind a fixed ring 26 at its forward end. The latter ring has three axial recesses 27 serving as guiding passages for the leg portions 25 of the jaws 24.

The openings 30 and recesses 27 accommodate the jaws 24 with a given clearance, to enable gripping portions 28 to move radially outwardly by the necessary amount for releasing the jaws from the flange 15 of the pipe stub 14, so as to allow the removal of the device in its entirety when the jaws are moved, with the aid of the ring 31, axially outward from the housing 10. To ensure that the gripping portions will move radially inwardly from the pipe stub 14, behind the flange 15, when the jaws 24 are moved in the opposite axial direction in relation to the housing 10 with the aid of the ring 31, i.e. axially upwardly in FIG. 3, the leg portions 25 are formed adjacent the gripping portions 28 with obliquely outwardly folded portions 32 which coact with beveled exterior portion 33 at the bottom surfaces of the recesses 27.

For operating the ring 31, and in turn the jaws 24, there is a ring rotatably mounted on an upper part of the housing 10 (FIGS. 1–3). Ring 35 rests against a stationary support flange 36 and includes on its side facing away from flange 36 two helical cam surfaces 37. Each cam surface 37 extends along half of the circumference of the ring 35. Along the major part of each cam surface 37 there is an axial slot 38 (FIG. 1) in the ring a 35 concentric with the central axis of the housing 10. Extending axially and mutually opposed on either side of the housing 10 are rods 39 (FIG. 1). Each rod 39 passes through one of the slots 38 and is provided with threads at one end for receiving a nut 40 and washer 42. The other forward ends of each rod are fixed to the ring 31, e.g. by providing the rod end portions with a thread for screwing into an internally threaded hole in the ring 31.

Around each rod 39 there is a compression spring 41, one end of which bears against the inward side of the ring 31 and the other end bearing against a lug 43 rigidly connected to the housing 10 and situated against the downward side of the flange 36. With the aid of the nuts 40, the washers 42 are caused to bear against their respective cam surface 37 on the ring 35, against the bias of the springs 41, which urge the ring 31 away from the open or lower end of the housing 10.

As shown in FIGS. 1–3, ring 35 is provided with a radially projecting pin 44 which serves as a manual operating means. When the ring 35 is turned with the aid of this pin, the ring 31 will be moved axially upwards or downwards on the housing 10 depending on which way the ring 35 has been turned, thus causing the jaws 24 to move in the respective opposite direction. In one turning direction, jaws 24 are brought into engagement with the flange 15 on the pipe stub 14 for fastening the housing 10 thereto. However, turning ring 35 in the other direction will cause jaws 24 to release their engagement with the flange 15 and allow removal of the device in its entirety from the pipe stub 14.

In FIG. 1 there is illustrated a tool generally denoted by the numeral 45, with the aid of which the bung 17 can be maneuvered by hand from a position outside the housing, when the housing 10 is mounted on the pipe stub 14. Tool 45 has a tubular spindle 46 with a circular cross section, which is movably and rotatably mounted in a sealed through opening in the housing 10 at the closed end thereof. At its end situated outside the housing 10, the spindle 46 is provided with a handle, while at its other end it is provided with a holder means for bung 17, denoted by the numeral 48.

Figure 7:
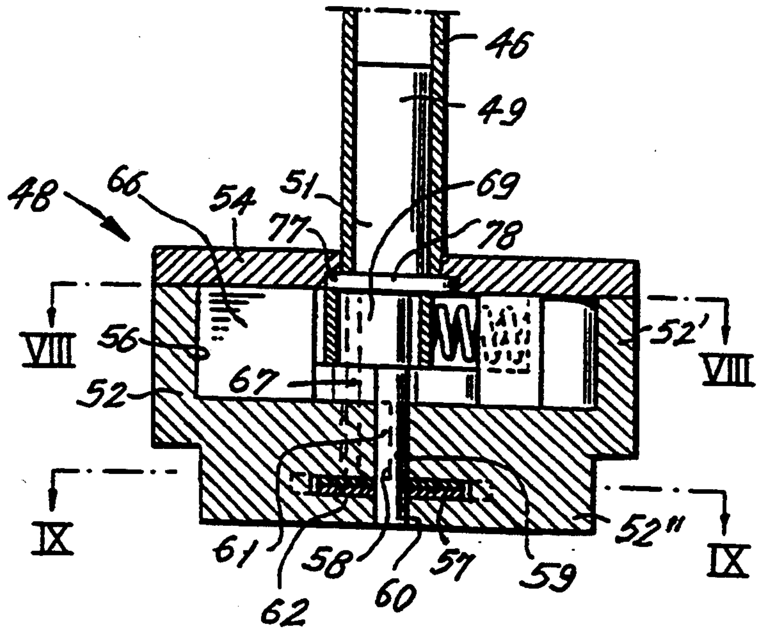
FIG. 7 is an axial cross-section of the bung holder.

As will be most easily seen from FIGS. 6 and 7, the bung holder means 48 includes a shaft, the upper portion 51 of which is inserted in the spindle 46 and locked therein with a locking pin 50 (FIG. 6). The bottom of the spindle abutts against a flange 78 (FIG. 7) on the shaft, which continues downwards by a portion 61 having a smaller diameter. The holder 48 means also includes a cylindrical body 52 which is fastened to a disc-shaped lid 54 by two screws 53. Parts 52 and 54 are limitedly rotatable about the spindle. The lid 54 is provided with a hole accommodating the spindle and a recess 77 for accommodating the circular flange 78 (FIG. 7).

As shown in FIG. 7, body 52 is preferably made of a plastics ejection moulded material, which has an upper cylindrical portion 52' of a greater diameter, then a lower generally cylindrical portion 52''. The lower portion 52'' is provided with two diametrically oppose circumferential recesses 55 extending the full height of the portion and having a radially inwardly tapering shape, as is shown most clearly in FIG. 9.

Figure 9:
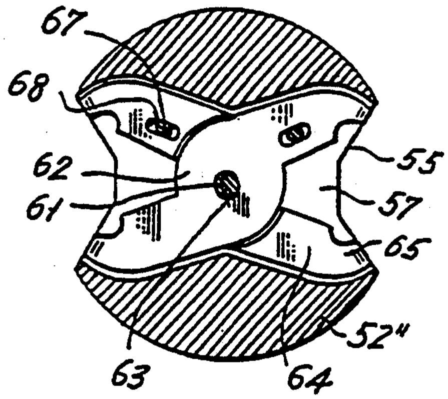
FIGS. 8 and 9 are cross-sectional views of the bung holder means taken along lines VIII—VIII and IX—IX of FIG. 7, respectively, showing the bung holder in a first state.
Figure 11:
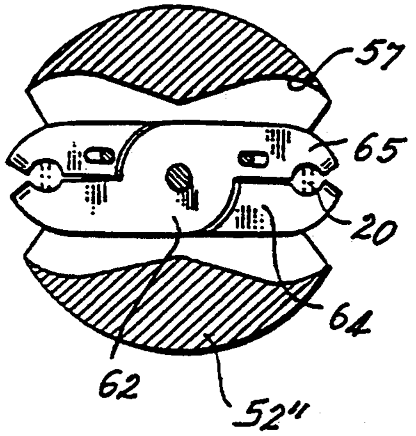
FIGS. 10 and 11 correspond to FIGS. 8 and 9, and are cross-sections through the bung holder showing it in a second state.

In upper portion 52', the body 52 is provided with a generally rectangular recess 56, as seen in plan in FIG. 7, which extends into upper portion 52', from the upper side of the body In lower portion 52'' the body is provided with a flat, relatively shallow cavity 57, extending in the transverse direction of the portion between both recesses 55, and has a shape more closely illustrated in FIGS. 9 and 11. In the wall between the cavity 56 and 57, there are two parallel through slots 58 (FIG. 8), which are situated on either side of a central through hole 59 in the wall. There is also a corresponding central through hole 60 in the wall of the portion 52" situated outwards of the cavity 57. Holes 59 and 60 serve as journaling holes for the downward portion 61 of the spindle.

The cavity 57 accommodates two grippers 62, one on top of the other, which with the aid of central through holes 63 therein re pivotally mounted on the shaft portion 61. Each gripper includes two gripping jaws 64 formed at their outer ends with claw-like gripping portions 65. The grippers 62 can be pivoted about the shaft portion 61 between inoperative and operative positions. The inoperative position is illustrated in FIG. 9, wherein both gripping portions 65 of each pair of coacting gripping jaws 64 associated with different grippers are retracted within the recesses 55 and with portion 65 situated at a maximum distance from each other. The operative position is illustrated in FIG. 11, wherein portions 65 are urged together in the recesses 55, in which positions the gripping portions 65 of the gripping jaws can releasably engage projections 20 (FIGS. 5A, 5B) of bung 17. Projections 20 are accommodated within recesses 55, for releasably retaining the bung 17 and the bung holder means 48 together.

Figure 8:
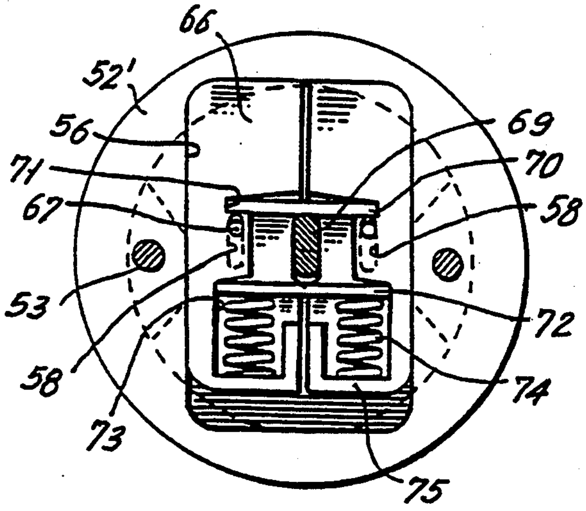

Referring to FIGS. 7–9, in the recess 56 along the longitudinal direction there are two juxtaposed, generally rectangular, movable blocks 66 serving as carriers for the grippers 62. Each block 66 is provided with a downwardly directed pin 67 (as seen in FIG. 7) for coaction with a gripper 62. The pin 67 passes through opening 58 into an elongate hole 68 in gripper 62 (FIG. 9).

Figure 10:
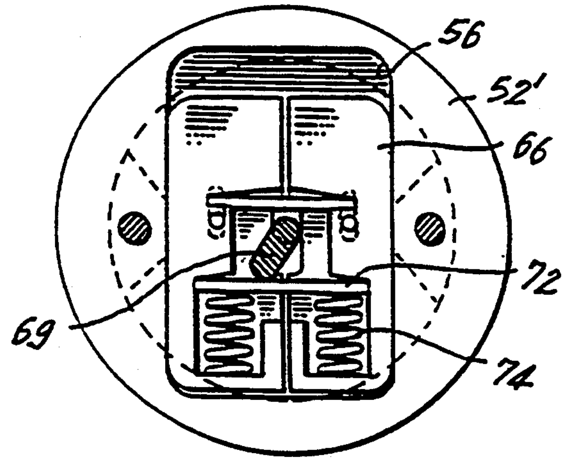
Figure 12:
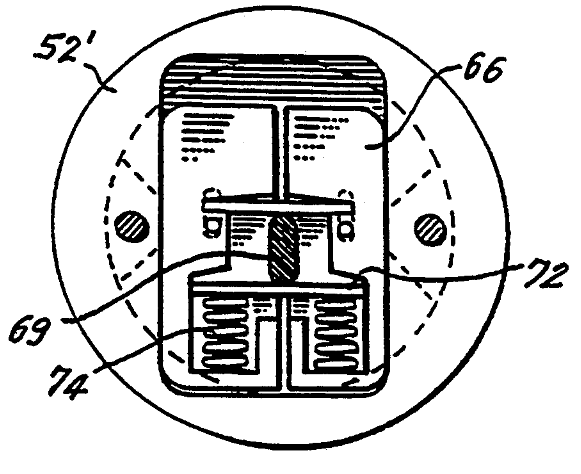
FIG. 12 is a cross-section corresponding to FIG. 8, showing the bung holder in a third state.

The spindle 51 is provided inside the recess 56 with a radially projecting blade 69 for providing a sliding movement to the blocks 66, and thus in turn actuating the grippers 62. Accordingly, when the tool spindle is turned in relation to the bung hole means 48, the grippers 62 are also actuated. As will be seen from FIGS. 8, 10 and 12, the blade 69 is adapted for actuating the blocks 66 via two rubbing plates 70, 72 extending substantially transverse to the blocks 66. The shorter plate 70, situated uppermost in FIG. 8, is retained at its short ends within a slot 71 in the respective block, while the somewhat longer plate 72, below plate 70, projects into larger recesses 73 in the blocks. Accommodated in the blocks there are two compression springs 74 oriented in the longitudinal direction of the blocks, such as to have one end bearing against the downward side of the plate 72 and the other end bearing against an end wall 75 in the respective block 66.

The arrangement described above operates in the following manner. When the device has been placed over the hole 13 formed in the pipe stub 14 and is fastened to the flange 15 with the aid of the fastening means 11, the bung holder means 48 is urged against the bung 17 with the aid of the handle 47. The lower portion 52" of the body 52 is inserted into the cavity 19, provided that the bung holder means 48 has been previously brought into a position in which the recesses 55 are situated directly opposite the respective projections 20 of the bung 17, and that both grippers 62 are in their inactive positions illustrated in FIG. 9. The tool spindle 46 is then rotated by handle 47 in a counter clockwise direction. The blade 69 moves from its position illustrated in FIG. 8, in relation to the bung holder body, to the position illustrated in FIG. 12, where the springs 74 ensure good retention between the projections 20 on the bung 17 and the gripping portions 65 of the jaws 64. With continued counter-clockwise movement of the spindle 46, the rotation is translated from the spindle to the bung 17 via the wall surfaces of the recesses 55 facing toward this turning direction. The bung 17 is thus screwed out of the pipe stub 14. The bung 17, still retained positively by the bung holder means 48, can then be withdrawn axially with the aid of the handle 47, away from the pipe stub and into a position which allows free fluid passage through the housing 10, between the hole 13 and an opening in the circumferential wall of the housing 10 formed by projecting pipe stub 76 (FIG. 1).

If so desired, the bung 17 can be once again screwed into the pipe stub 14 with the aid of the tool 45 for closing the hole 13. When the bung has been tightened down, the gripping jaws 64 will be moved back again into their inactive positions as illustrated in FIG. 9 for continued rotation of the handle 47 in a clockwise direction, thus releasing the projections 20 of the bung 17, so that the bung holder means 48 can be removed therefrom, and the entire device can be removed.

A particular advantage of the bung holder means described above is that the springs included therein not only ensure positive retention of the projections 20 of the bung, but also make it possible to retain bungs having projections with highly varying widths.

The housing 10 and the rings 26, 31 and 35 together with the body of the bung holder means 48 may be suitably produced by ejection moulding a suitable plastic. However, the jaws 24 and grippers 62 should be made from metal, e.g. steel.

The second embodiment of a bung holder means 80 illustrated in FIG. 13 is solely intended for use with bungs 17 of the type illustrated in FIG. 5A. With this bung 17 each of the diametrically opposing projections 20 accommodated in the cavity 19 of the bung have a through opening extending practically peripherally or tangentially.

Bungs of the kind just mentioned dominate the market completely at the present for container such as barrels, and if such a container should be provided with a bung of some other type, the bung can easily be exchanged so that a device with a bung holder means which can only be used with such a bung can be used.

As will be most easily seen from FIGS. 14 and 15, the gripping means of the bung holder means 80 are formed by two grippers 90 extending in a peripheral direction diametrically opposite each other. Each is insertable in a through opening extending substantially peripherally or tangentially in each of the projections of the bung 17 and is adapted for retaining the bung 17 with the holder means 80 by coaction with inner wall surfaces of the opening. In the simplest case, grippers 90 may be configured as elongate elements rigidly connected at their ends to the body of the bung holder means 80, and can be made integral therewith, or may be separate elements rigidly attached thereto. In turn, the body can be rigidly connected to the tool spindle 46. Preferably, the grippers 90 should be limitedly movably mounted in the body. Suitably, the latter can be provided with two diametrically opposed peripheral recesses, for accommodating the respective projection on the bung. The grippers can then be movable between an inactive position retracted from the recesses and an operative position where they thrust into the respective recesses. The grippers 90 can advantageously be joined to each other by an intermediate connection member, which advantageously is integral therewith.

The grippers 90 are preferably formed by arcuate end portions of a metal wire element 89, which also includes an intermediate portion forming the connection element. In addition, the body of the plug holder means can be limitedly rotatably mounted on the tool spindle 46, while the connecting element can be non-rotatably connected to the tool spindle for moving the grippers 90 between inactive and active positions, by turning the tool spindle in relation to the body. As will be seen from FIG. 16, the bung holder means 80 has two main parts, an upper part 81 and a lower part 82, which is limitedly rotatably mounted on the tool spindle 46.

The lower part 82 is made of a generally cylindrical body, having on its underside a transverse recess 83. Recess 83 forms a free space accommodating the transverse middle portion of the plate member 21 on the bung. At either end of recess 83, recesses 84 are provided in the circumference of the part 82 for receiving the loop-like projections 20 formed by folding the end portions of the plate 21. The upper side of the lower part 82 is provided with a recess 85 (FIG. 14), which includes a central, cylindrical portion 86, two sector portions 87 on either side thereof, and two narrow arcuate grooves forming the portions 88, which extend from an outer corner of the respective portion 87 to its respective recess 84.

In the recess 85, there is a metal wire element 89 arranged to rest in a horizontal position on the bottom thereof. Element 89 has the two opposing arcuate grippers 90 and an intermediate, straight connection member 91 extending diametrically on the part 82. The element 89 is rotatable in the part 82, between the positions illustrated in FIGS. 14 and 15, with the aid of the tool spindle 46, which is rotatably mounted at its lower end in the central cylindrical portion 86 of the recess 85. Spindle 46 is provided with a transverse slot 92 (FIG. 16) for accommodating the middle section of the connecting member 91.

The upper part 81 of the bung holder means 80 is formed as a circular lid mounted on the lower part 82 and is fastened to the latter with the aid of two screws 93 (FIG. 16), extending through free holes 94 (FIG. 17) in the part 81 and threaded through hole 95 of lower part 82. There is a central opening 96 in the part 81, in which the tool spindle is rotatably mounted.

The upper part 81 has at its lower side a shallow circular recess 97 for accommodating the upper end portion of the part 82. Upper part 81 in addition is provided with two diametrically opposed projections 98 extending downwards from the bottom surface of the recess 97 and into the portions 87 and 88 of the recess 85, for keeping the metal wire element 89 resting against the bottom of the recess 85. The tool spindle 46 is provided with a transverse locking pin 89 engaging against the bottom surface of the recess 97 for preventing the spindle from being withdrawn from the bung hold holder means 80.

The bung holder means 80 functions in the following way. When the metal wire element 89 is in the position illustrated in FIG. 14, the lower part 82 can be inserted in the cavity 18 of the bung 17 with the projections 20 accommodated within the recesses 84. When the element 89 is turned by the tool spindle 46 from the position illustrated in FIG. 14, to the one illustrated in FIG. 15, both the gripping portions 90 are inserted in the generally peripheral or tangential opening in each of the projections 20, between the substantially vertical legs thereof, indicated by chain-dotted lines in FIG. 15. The bung holder means 80 can thus retain the bung 20 (FIG. 5A) and allow it to be screwed out of the pipe stub 14 to be withdrawn axially from the latter.

I claim:

1. A filling and emptying device for a fluid in a container, the container including an emptying or filling hole having a pipe stem and a flange thereon, the emptying or filling hole being closable by a bung, the bung including an outwardly open substantially cylindrical cavity and two mutually spaced projections disposed within the cavity, the device comprising:

a housing having opposed ends, one of the ends being an open end adapted to be removably mounted over the pipe stem of the emptying or filling hole of the container;

a tool for manually operating the bung for filling and emptying the container from a position outside the housing, the tool including a spindle, having opposed ends, which extends slidably and rotatably within the housing through the other end of the housing, and a handle located on one of the opposed ends of the spindle;

fastening means located on the open end of said housing for sealingly engaging said housing with the flange of the pipe stem, said fastening means including a plurality of jaws projecting from the open end of the housing for gripping the flange and maneuvering means for actuating the plurality of jaws to grip the flange;

bung holder means disposed on the other end of the spindle for releasably retaining the bung, said bung holder means including gripping means for releasably engaging the projections of the bung; and operating means rotatably mounted on the other end of said housing for operating the maneuvering means.

2. The device of claim 1, wherein each of the plurality of jaws include an outwardly folded end, an inwardly folded gripping end, and a leg portion extending therebetween.

3. The device of claim 2, wherein the maneuvering means comprises a fixed ring arranged at the open end of the housing and a first movable ring axially displaceable with respect to the fixed ring by the operating means.

4. The device of claim 3, wherein the outwardly folded end of each of the jaws is accommodated in the first movable ring and the inwardly folded end of each of the jaws is accommodated within the fixed ring, such that when the first movable ring is moved toward the fixed ring, the gripping end of each of the jaws is released from the flange, and when the first movable ring is moved away from the fixed ring, the gripping ends engage the flange.

5. The device of claim 4, wherein the operating means comprises a second movable ring having a pair of helically rising cam surfaces, each of the cam surfaces having an elongate slot for coaction with end portions of rods which extend axially and exterior of the housing, each of the rods having opposed ends, one end of each of the rods being glidably received in the respective slot of the second ring, the other end of each of the rods being connected with the first movable ring.

6. The device of claim 5, wherein the bung holder means includes a body having an upper and lower portion, the upper portion of the body having a recess and the lower portion having a cavity.

7. The device of claim 6, wherein the gripping means comprises a pair of grippers pivotally mounted in the cavity of the lower portion of the body, the grippers being engagable with the projections of the bung.

8. The device of claim 7, wherein each of the grippers is pivotally mounted about a mutual pivot axis which is concentric with a longitudinal axis of the spindle of the tool.

9. The device of claim 8, wherein each of the grippers has opposed ends and a gripping portion at each of said ends, each gripping portion engaging a respective projection of the bung, such that each projection is engaged by a gripping portion of both of the grippers.

10. The device of claim 9, wherein the lower portion includes a pair of opposed circumferential recesses, the cavity extending in a transverse direction between the recesses, the grippers being movable between an inoperative position where each gripping portion is retracted within the recesses and an operative position where each gripping portion is urged together to extend beyond the recesses to grasp the respective projections.

11. The device of claim 8, further comprising carrying means movably disposed within the recess of the upper portion of the body for pivoting the grippers.

12. The device of claim 11, wherein the spindle includes actuating means which project within the recess of the upper portion for actuating the carrying means and, in turn, the grippers.

13. The device of claim 12, wherein the carrying means comprise a pair of blocks disposed side by side within the recess, each of the blocks including a pin which moves within a slot in a respective gripper, such that when the blocks are actuated, the pin pivots the respective gripper about the pivot axis.

14. The device of claim 13, wherein the carrying means includes a first and second plate extending transversely within slots in both of said blocks, and a spring located between the second plate and an end wall of each of said blocks.

15. The device of claim 14, wherein the actuating means comprises a blade which is rotatably located within both of the blocks, such that, when the spindle is rotated, each blade moves the respective block to pivot the grippers.

16. The device of claim 5, wherein the bung holder means includes an upper and lower part, the lower part being limitedly rotatably mounted on the spindle.

17. The device of claim 16, wherein the projections of the bung each include a through opening and the gripping means comprises two diametrically mutually opposed grippers which are insertable through the openings of the bung projections, the grippers being adapted for retaining the bung with the bung holder means by coaction with inner wall surfaces of the openings.

18. The device of claim 17, wherein the grippers are formed from arcuate end portions of a metal wire element connected to each other by an intermediate connection member, the grippers being movably mounted between the upper and lower parts of the bung holder means.

19. The device of claim 18, wherein the lower part of the bung holder means includes two diametrically opposed peripheral recesses for accommodating the bung projections, the grippers being movable between an active position in which the grippers extend beyond the recesses and an inactive position in which the grippers are retracted within the recesses.

20. The device of claim 19, wherein the connection member is non-rotatably connected to the other end of the spindle, wherein when the tool spindle is rotated the grippers are moved between the inactive and active positions.

* * * * *